United States Patent Office 3,173,863
Patented Mar. 16, 1965

3,173,863
PROCESS OF DEWATERING SEWAGE SLUDGE
Thomas H. Oster, 156 S. Franklin St., Dearborn, Mich., and Jack E. Cooper, 1375 W. Ann Arbor Trail, Plymouth, Mich.
No Drawing. Filed Oct. 4, 1963, Ser. No. 313,790
2 Claims. (Cl. 210—52)

This invention relates to the field of sewage disposal and more particularly to a process for the preparation of sludges for dewatering by filtration to a water content sufficiently low to permit incineration without the addition of extraneous fuel.

This invention is applicable to activated sludges or to primary sludges either with or without the addition of trickling filter sludges or activated sludges. These sludges have been treated for at least thirty years by the addition of a solution of ferric chloride and lime followed by agitation. The action of this combination of chemicals on the sludge is obscure, but it does permit the resultant mixture of sludge, lime and ferric chloride to be satisfactorily dewatered, usually upon a rotary vacuum filter.

This invention is predicated upon our discovery that many sludges containing at least 3 percent of solids can be conditioned for filtration more satisfactorily and economically if ferrous chloride is substituted for part or all of the ferric chloride formerly used. A pressure differential of at least 3 inches of mercury should be maintained across the filtering medium. Other than the substitution of ferrous chloride for part or all of the ferric chloride the remainder of the process, that is, the addition of lime, the agitation and the filtration remains the same.

A particular object of this invention is the conditioning of sludge so that it may be dewatered by vacuum filtration to a degree that it will at least easily support its own combustion and preferably to a point where it will be able to produce excess heat over and above that necessary to support its own combustion. This degree of dewatering of sludge permits economies in the operation of the sewage disposal facility because no fuel need be purchased to support the incineration of the sludge.

This process is not to be confused with processes employing iron salts to coagulate dilute sewage as taught in Muskat, 2,338,958, issued January 11, 1944, nor with the use of iron salts in the absence of lime to produce gas bubbles as shown in Halvorson, 2,590,964, granted April 1, 1952.

As a demonstration of this invention we obtained from the Detroit Sewage Disposal Plant a sample of primary sludge containing 0.68 pound of solids per gallon. A solution of ferric chloride was prepared by dissolving 10 grams of $FeCl_3 \cdot 6H_2O$ in water and making the volume up to 100 cubic centimeters. A solution of ferrous chloride was prepared by dissolving 17.3 grams of $FeCl_2 \cdot 4H_2O$ in water and making the volume up to 100 cubic centimeters. Similarly, a slurry of 10 grams of calcium hydroxide in a volume of 100 cubic centimeters of water was prepared.

An arbitrary test of sludge conditioning efficiency was used which consisted of treating a 100 cubic centimeter sample of sludge first was the ferrous chloride or ferric chloride or a mixture of these two salts, then adding 7.5 cubic centimeters of lime slurry followed by one minute of gentle hand stirring. This entire mixture was then poured quickly into an eleven centimeter Buechner funnel connected to an adequate vacuum system. The times noted extend from the pouring of the sludge into the funnel until the vacuum in the system dropped from the maximum value of about 28 inches of mercury to an arbitrarily selected value of 15 inches of mercury. At this stage a satisfactorily dry cake had been obtained.

The results obtained in this series of tests may be summarized as follows:

| Test | $FeCl_3$ (cc.) | Ferric Iron Fe, percent dry solid | $FeCl_3$, percent dry solid | $FeCl_2$ (cc.) | Ferrous Iron Fe, percent dry solid | $FeCl_2$, percent dry solid | Fe, total percent dry solid | Time, seconds |
|---|---|---|---|---|---|---|---|---|
| 1 | 2.60 | 0.66 | 1.92 | None | None | None | 0.66 | 41 |
| 2 | None | None | None | 1.11 | 0.66 | 1.49 | 0.66 | 36 |
| 3 | 1.30 | 0.33 | 0.96 | 0.55 | 0.33 | 0.75 | 0.66 | 36 |
| 4 | 0.90 | 0.23 | 0.66 | 0.50 | 0.30 | 0.66 | 0.56 | 34 |
| 5 | 0.60 | 0.15 | 0.44 | 0.50 | 0.30 | 0.66 | 0.59 | 37 |
| 6 | 0.30 | 0.08 | 0.22 | 0.50 | 0.30 | 0.66 | 0.30 | 40 |
| 7 | 0.90 | 0.23 | 0.66 | 0.50 | 0.30 | 0.66 | 0.53 | 38 |
| 8 | 0.90 | 0.23 | 0.66 | 0.50 | 0.30 | 0.66 | 0.53 | 36 |
| 9 | 1.30 | 0.33 | 0.96 | 0.30 | 0.18 | 0.40 | 0.51 | 38 |
| 10 | 2.60 | 0.66 | 1.92 | None | None | None | 0.66 | 38 |
| 11 | None | None | None | 1.10 | 0.66 | 1.49 | 0.66 | 35 |

In each instance in the above tests where both ferric chloride and ferrous chloride were employed in the same test these chemicals were added separately except in Test No. 7 in which the chlorides were premixed. The 2.60 cubic centimeters of $FeCl_3$ solution detailed above contains 0.156 gram of $FeCl_3$ on an anhydrous basis. Similarly, the 1.11 cubic centimeters of $FeCl_2$ solution contains 0.123 gram of $FeCl_2$ on an anhydrous basis.

It is conventional for sewage disposal plants to purchase ferric chloride in a forty percent water solution. Sewage plant operators may effect a substantial reduction in chemical costs in most cases by contacting this ferric chloride solution with scrap iron or scrap steel for a sufficient period of time to permit at least a substantial portion or all of the ferric chloride to be reduced to ferrous chloride with the concomitant dissolution of the scrap iron. This reaction proceeds more smoothly if the ferric chloride solution is strongly diluted with water prior to contacting it with the scrap iron or scrap steel. Cast iron or steel borings or tin cans are adequate for this purpose. It is clear that under some economic conditions it may be advantageous for the producer of the ferric chloride to partially or completely reduce the ferric chloride solution to ferrous chloride before shipping it to the sewage plant.

This application is a continuation-in-part of application Serial Number 63,994, filed October 21, 1960, now abandoned.

We claim as our invention:
1. The process of dewatering a sewage sludge containing at least 3 percent by weight solids comprising adding to the sludge lime and a treating agent containing ferrous chloride in an amount effective to obtain a dewatered sludge of diminished water content as compared to the use of equal weights of ferric chloride, whereby diminished amounts of extraneous fuel will be required for incineration of the obtained dewatered sewage sludge, agitating the mixture of sludge, lime and ferrous chloride and finally dewatering the sludge by filtering the mixture through a filtering medium while maintaining a pressure differential of at least 3 inches of mercury across the filtering medium.

2. The process recited in claim 1 in which the treating agent consists essentially of ferrous chloride.

References Cited by the Examiner

UNITED STATES PATENTS

| | | | |
|---|---|---|---|
| 2,338,958 | 1/44 | Muskat | 210—50 |
| 2,665,249 | 1/54 | Zimmerman | 210—63 |

OTHER REFERENCES

Bloodgood: Water Works and Sewerage, 83, 251 (1936).

"Sewage—Treatment Works," Keefer, first edition, 1940, McGraw-Hill, New York, pp. 429–457, 478–485 and 496–500 relied on.

Groen: The Use of Steel Pickling Liquors for Sewage Sludge Conditioning, Sewage Works Journal, vol. 21, November 1949, pp. 1037–1049.

Bargman et al.: Sludge Filtration etc., Sewage and Industrial Wastes, vol. 30, September 1958, pp. 1079–1100.

Back et al.: Sew. and Ind. Wastes, 1955, vol. 27, pp. 589–705.

MORRIS O. WOLK, *Primary Examiner.*